Sept. 22, 1942.   A. H. SCHUTTE   2,296,456
SEPARATION OF DIFFERENT MELTING POINT MATERIALS
Filed May 18, 1939
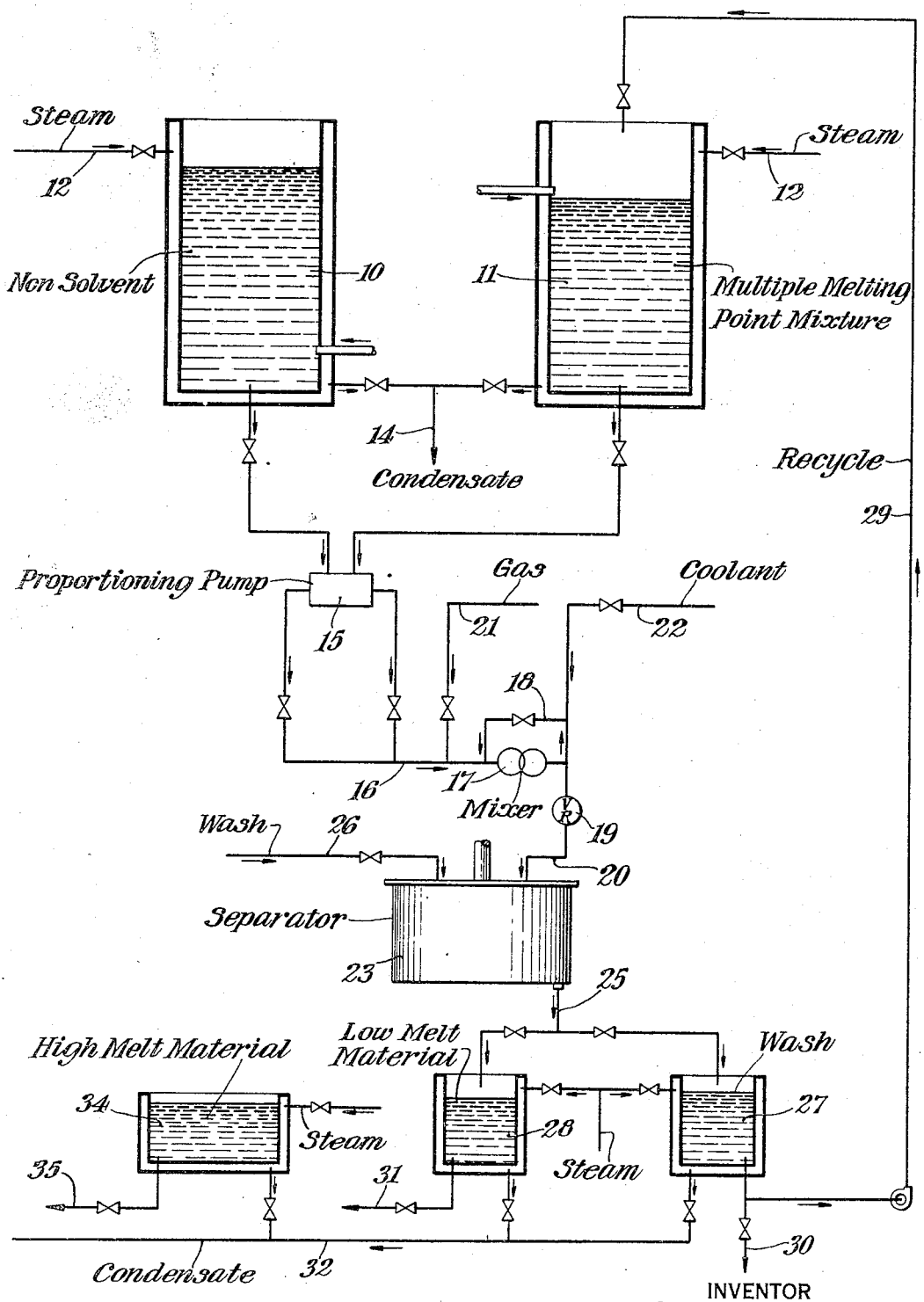
INVENTOR
August Henry Schutte
BY Nathaniel Ely
ATTORNEY Patented Sept. 22, 1942

2,296,456

UNITED STATES PATENT OFFICE 2,296,456

SEPARATION OF DIFFERENT MELTING POINT MATERIALS

August Henry Schutte, Westfield, N. J.

Application May 18, 1939, Serial No. 274,412

12 Claims. (Cl. 252—303)

This invention relates to a method for the partial separation of various melting point materials from mixtures thereof and more particularly to the concentration of higher melting point materials from lower melting point materials in a mixture thereof. It is, in a sense, a fractional solidification and separation by the aid of an emulsion whereby separation is facilitated.

The principal object of my invention is to provide an improved method of separation of mixtures of materials which have separate melting points and of which at least one will solidify when cooled. Such separation of many materials is normally very difficult because of the tendency of the initially solidifying material to obstruct the flow of the liquid medium or the tendency of the liquid component to adhere to the solid matter. Filter rates, or settling rates are frequently very low, and therefore a liquid-solid separation is often impracticable.

I have discovered that I can obtain a highly effective separation of mixtures of materials having different melting points by forming an emulsion of said mixture with a non-solvent material and thereafter cooling said emulsion to such a point that one of the materials to be separated becomes filterable or separable by liquid-solid separation from the other. In this case the non-solvent surrounds the crystals or solid particles and the liquid particles and produces a free settling, free draining and free filtering system. I then separate the liquids from the solids and thereafter separate out the non-solvent material.

I believe that my invention is of rather general application inasmuch as I have found it entirely successful on materials of different characteristics. As an example of the materials on which I have had considerable success, I have separated wax from lubricating oils to materially improve the cold test thereof and I have also been able to separate crude scale wax or finished high melting point wax from slack wax while producing a relatively low melting point foots oil.

I have also separated certain mixtures of animal and vegetable oils, the constituents of which have various melting points and particularly fatty acids, such as stearic and oleic, using water as a non-solvent. I believe that my invention is also applicable to separation of other acids such as linoleic from oleic and to the separation of naphthalene from anthracene as well as other products obtained in the distillation of coal tars. My invention is also applicable to the separation of certain azeotropic mixtures, one or more components of which are crystallizable. The invention may also be carried out in the separation of mixtures of isomers, such as alpha and beta naphthol or their derivatives, using water as a non-solvent. Acetic acid-water mixtures may also be concentrated, using an acetic acid contacted light petroleum distillate as a non-solvent.

In accordance with a preferred form of embodiment of my invention, as shown on the attached drawing, which represents a general or typical flow sheet, it will be noted that I conveniently provide a plurality of tanks 10 and 11, in one of which I provide a suitable source of non-solvent liquid which in many cases can be water, and in the other tank I provide the mixture of materials having different melting points. These tanks may be steam-jacketed if high melting point materials are treated, and in such case the steam enters at 12 and the condensate is removed at 14.

Predetermined quantities of the non-solvent liquid and multiple melting point mixture are then intimately mixed as by proportioning pump 15, the streams being consolidated in the manifold 16 and introduced into mixer 17. This mixer is of any suitable type of emulsifier or homogenizer, but I find that in many cases a rotary pump is adequate if provided with a by-pass 18 and a relief valve 19. It will be appreciated that by adjusting the capacity of the mixer 17 it will be possible to recycle the material through the mixer as many times as may be desirable so that the resulting material discharged through line 20 is suitably emulsified. I may find it desirable to add a gas through line 21 to the mixture in manifold 16 to aerate or otherwise expand the emulsion, and in some cases I can use the gas to the exclusion of a liquid non-solvent material. I prefer to directly cool the emulsion as by the direct introduction of a coolant at 22 into the by-pass line 18, where this is possible, otherwise indirect cooling may be applied satisfactorily. Both direct and indirect cooling may be used, if desired.

Having established a suitable emulsion with a large interfacial area between the crystallized material and the non-solvent, I am able to obtain a very high rate of separation in the liquid-solid separator 23. Although this is indicated as of the centrifugal type, it may be either a centrifugal filter, having a foraminous filter basket, or it may be of a clarifier type, having a solid bowl. It is, of course, in the contemplation of my invention, that the separator, the primary function of which is to separate liquids from solids, may be of any desired type, including pressure or vacuum filters of the continuous or other type, and having filter discs or a drum as may be desired. In some cases gravity settling may be practicable.

In the preferred form of embodiment of my invention, and for some types of mixtures to be separated, I find a centrifugal basket filter, having a perforated, rotating basket lined on the interior with a foraminous filter medium, to be most effective. This is rotated at such a speed that a high separating force is obtained, which may be in the range of 500 to 1,000 times gravity or more.

The cake formed is normally a fine-grained, free-filtering, porous type, and as the filtering force is gravitational by nature, the entire cake is submitted to the filtering force without an external crushing action. It is, of course, possible and usually desirable to wash such cake with a wash liquid from line 26, and such wash liquid will readily permeate the cake, and uniform drying and washing of the cake are thus possible.

The wash liquid may be either a diluent for the liquid material of the emulsion, or a liquid which is inert and non-reactive therewith. In the method of dewaxing an oil, as disclosed in my co-pending application, Serial No. 192,534, filed February 25, 1938, now Patent No. 2,168,140 issued August 1, 1939, the temperature of the material is such that naphtha or other oil solvent is desirable. However, it may be preferable to use an inert and non-solvent wash liquid as set forth in my co-pending application, Serial No. 232,263, filed September 29, 1938, now Patent No. 2,168,306, issued August 1, 1939, and in such case the wash liquid does not dilute the liquid part of the emulsion and yet serves as a suitable displacing medium which is especially effective where the solid part of the emulsion is porous as in the instant case.

With the proper temperature control the liquid that is removed from the filter cake is withdrawn through the line 26 either into the wash tank 27 or into the filtrate tank 28, each of which is suitably heated to assure continuity of flow. If the quality of the material in the wash tank 27 is found to have substantial value, it can be conveniently recycled through the line 29 back to the multiple melting point mixture tank 11. The tanks 27 and 28 have discharged lines 30 and 31, and a steam condensate drain indicated at 32. The filter cake, which is the high melting point material, may be removed from the separator and placed in the tank 34 and heated so that the higher melting material may be withdrawn as a liquid at 35.

As an example of the operation of my invention on fatty acids, I have separated a mixture of stearic and oleic acids which have melting points of 135° F. and 56° F. respectively. A 50% by weight mixture of each material was found to have a melting point of 107° F. Thereafter this mixture was emulsified with water as described, and introduced into a centrifual filter after which a filtrate amounting to 18.8% of the total mixture was found to have a melting point of 95° F., and the filter cake, which amounted to 81.2% of the mixture was found to have a melting point of 115° F. The emulsification and separation may be repeated if a more complete separation is desired.

Another illustration of the operation of the process is on commercial slack wax having a melting point of 116° F. which was emulsified with water in the ratio of 1:1 and mixed with some air to form a suitable emulsion at a temperature of about 112° F. This was then washed in the centrifuge at approximately 115° F. with a resulting commercial crude scale wax containing 1% oil and having a melting point of approximately 128° F. and a foots oil of 109° F. The ratio of wax to filtrate was 34 parts of wax cake to 66 parts of filtrate. The filtrate was then again emulsified and reduced to a foots oil of 90° F. The crude scale wax was transformed to a finished wax having a melting point of 133° F.

As a further example of materials which I have treated in accordance with this invention, is the separation of a mixture of alpha naphthol from beta naphthol. The mixture used had a melting point of approximately 135° F. and was emulsified with water, cooled to approximately 127° F. and charged to the centrifugal separator. The filtrate had a melting point of approximately 122° F. and the unwashed cake had a melting point of 185° F.

Beta naphthol having a melting point of 239° F. was emulsified with water, cooled, and centrifuged with a resulting cake having a melting point more than 6° F. higher.

One of the principal advantages of the invention is that the materials are separated by their melting points rather than their boiling points and constant boiling mixtures or tarry decomposition products normally caused by distillation, are avoided. This method of emulsification with a non-solvent is applicable to virtually all processes where fractional distillation is now used. It is, therefore, applicable particularly to the separation of mixtures where one or more of the components will solidify before the remainder. It is not limited to crystallizable materials, however, for in certain cases, as in the removal of an amorphous wax from petroleum oils of lubricating quality, it is possible to use a freezing and crystallizing non-solvent such as water and freeze it with the result that the crystalline structure made in situ facilitates the separation of the oil from the amorphous wax.

The process is far quicker and more economical than the usual methods of crystallization, since it makes possible a better separation with truly continuous operation and accurate temperature control.

While I have shown and described a preferred form of embodiment of my invention, I am aware that other modifications may be made thereto and I, therefore, desire a broad interpretation of my invention within the scope and spirit of the disclosure herein and of the claims appended hereinafter.

I claim:

1. The method of separating a non-gaseous physical mixture of at least two organic compounds having different melting points into predetermined fractions, which comprises maintaining said mixture in a liquid condition, forming an emulsion thereof with an inert gaseous material, which is not substantially soluble in or a solvent for said mixture, and a non-solvent, non-reactive liquid material, cooling said emulsion to a temperature such that at least one of the predetermined fractions is solidified, and thereafter making a liquid-solid separation of the emulsion to separate the solidified material from the remaining liquid material.

2. The method of separating a non-gaseous physical mixture of at least two organic compounds having different melting points, which comprises maintaining said mixture in a liquid condition, forming an emulsion thereof with an inert gaseous material, which is not substantially soluble in or a solvent for said mixture and a non-solvent, non-reactive liquid material, cooling said emulsion to a temperature such that at least one of the compounds to be separated is partially solidified, and thereafter making a liquid-solid separation of the emulsion to separate said solidified material from the remaining liquid material.

3. The method of separating a mixture as claimed in claim 2, in which the separated solidified material is washed in place by a wash material which removes retained lower melting point material from the solidified material whereby the remaining solidified material has a higher melting point.

4. The method of separating a non-gaseous physical mixture of at least two organic compounds having different melting points, which comprises maintaining said mixture in a liquid condition, forming an emulsion thereof with air and water, the air and water being non-soluble and inert with respect to said compounds, cooling said emulsion to a temperature such that at least one of the materials to be separated is substantially solidified, and thereafter making a liquid-solid separation of the emulsion to separate said solidified material from the remaining liquid material.

5. The method of separating a non-gaseous physical mixture of at least two organic compounds having different melting points, which comprises maintaining said mixture in a liquid condition, forming an emulsion thereof with an inert gaseous material, which is not substantially soluble in or a solvent for either of said compounds, and a non-solvent, non-reactive liquid, cooling said emulsion to a temperature such that at least one of the compounds to be separated is substantially solidified, and thereafter centrifugally filtering the remaining liquid material from the solidified material.

6. The method of separating a mixture as claimed in claim 5, in which the separated solidified material is washed in place by a material which dissolves additional lower melting point material from the solidified material whereby the solidified material remaining has the highest melting point.

7. The method of separating a non-gaseous physical mixture of at least two organic compounds having different melting points, at least the highest melting compound to be separated comprising an amorphous solid, which comprises maintaining said mixture in a liquid condition, forming an emulsion thereof with an inert gaseous material, which is not substantially soluble in or a solvent for said mixture, and a non-solvent, non-reactive liquid material which solidifies in crystalline form, cooling said emulsion to a temperature such that the non-solvent liquid material crystallizes and the amorphous compound at least partially solidifies, and thereafter making a liquid-solid separation of the emulsion to separate the solidified material including the amorphous compound from the remaining liquid material.

8. The method of separating a non-gaseous physical mixture of at least one organic compound and water, the organic compound having a different melting point than water, which comprises maintaining said mixture in liquid condition, forming an emulsion thereof with an inert gaseous material, which is not substantially soluble in or a solvent for said mixture, and a non-solvent, non-reactive liquid material, cooling said emulsion to a temperature such that at least the highest melting point material partially solidifies, and thereafter making a liquid-solid separation of the emulsion whereby a fraction is obtained containing the organic compound in greater concentration than the initial mixture.

9. The method of separating a mixture of compounds including a compound containing a fatty acid radical by their differences in melting points, which comprises maintaining said mixture in liquid condition, forming an emulsion thereof with a non-solvent, non-reactive liquid, cooling said emulsion to a temperature such that at least one of the compounds is partially solidified, and thereafter making a liquid-solid separation of the emulsion to separate said solidified material from the remaining liquid material.

10. The method of separating a mixture of compounds including a compound containing a fatty acid radical by their differences in melting points, which comprises maintaining said mixture in liquid condition, forming an emulsion thereof with a non-solvent, non-reactive liquid and an inert, non-solvent gaseous material, cooling said emulsion to a temperature such that at least one of the compounds is partially solidified, and thereafter making a liquid-solid separation of the emulsion to separate said solidified material from the remaining liquid material.

11. The method of separating a mixture of stearic and oleic acids by their differences in melting points, which comprises maintaining said mixture in liqud condition, forming an emulsion thereof with water and air, cooling said emulsion to a temperature such that the stearic acid is at least partially solidified, and thereafter making a liquid-solid separation of the emulsion to separate said solidified stearic acid from the remaining liquid material.

12. The method of separating a mixture of linoleic and oleic acids, which comprises maintaining said mixture in a liquid condition, forming an emulsion thereof with water and air, cooling said emulsion to a point such that the oleic acid is at least partially solidified, and thereafter making a liquid-solid separation of the emulsion to separate the solidified oleic acid from the remaining liquid material.

AUGUST HENRY SCHUTTE.